US010853410B2

(12) United States Patent
Herz

(10) Patent No.: US 10,853,410 B2
(45) Date of Patent: Dec. 1, 2020

(54) METHOD FOR PROVIDING IMAGING SATELLITE INFORMATION ON A MOBILE DEVICE

(71) Applicant: Orbit Logic, Inc., Greenbelt, MD (US)

(72) Inventor: Alexander Herz, Washington, DC (US)

(73) Assignee: Orbit Logic, Inc., Greenbelt, MD (US)

(*) Notice: Subject to any disclaimer, the term of this patent is extended or adjusted under 35 U.S.C. 154(b) by 53 days.

(21) Appl. No.: 15/416,375

(22) Filed: Jan. 26, 2017

(65) Prior Publication Data

US 2017/0150060 A1 May 25, 2017

Related U.S. Application Data

(63) Continuation-in-part of application No. 15/130,310, filed on Apr. 15, 2016, now Pat. No. 9,779,301, (Continued)

(51) Int. Cl.
*G06F 16/58* (2019.01)
*G06F 3/0482* (2013.01)
(Continued)

(52) U.S. Cl.
CPC ........ *G06F 16/5866* (2019.01); *G06F 3/0482* (2013.01); *G06K 9/0063* (2013.01);
(Continued)

(58) Field of Classification Search
CPC ............ G06F 17/30268; G06F 3/0482; H04W 4/029; H04W 4/021; H04W 4/02;
(Continued)

(56) References Cited

U.S. PATENT DOCUMENTS 7,693,702 B1* 4/2010 Kerner .................. G06T 19/006
345/629
9,893,799 B2* 2/2018 Reis .................... H04B 7/18517
(Continued)

OTHER PUBLICATIONS

"Determine what satellites to display on screen in Augmented reality". Internet posting by Suppi on <https://stackoverflow.com/questions/9467462/determine-what-satellites-to-display-on-screen-in-augmented-reality>. Feb. 2012.*
(Continued)

*Primary Examiner* — Nathan A Mitchell
(74) *Attorney, Agent, or Firm* — Venable LLP

(57) ABSTRACT

A method and electronic mobile device display imaging satellite information on a screen of the mobile device. A viewing direction and angle of a camera of the mobile device, a location of the mobile device, and orbit information for satellites in a vicinity of the mobile device are all determined. Satellite tracks for each of the satellites determined to be in the vicinity of the mobile device are then computed based on the location of the mobile device, the viewing direction and angle of the camera of the mobile device, and the orbit information corresponding to each of the respective one or more satellites. A graphical representation of the computed satellite tracks may then be displayed on a display screen of the mobile device as an overlay over a real world image being captured in real time by the camera of the mobile device.

18 Claims, 8 Drawing Sheets

Related U.S. Application Data which is a continuation of application No. 14/630,807, filed on Feb. 25, 2015, now Pat. No. 9,344,994.

(60) Provisional application No. 61/947,941, filed on Mar. 4, 2014.

(51) Int. Cl.

| | | |
|---|---|---|
| *G06T 19/00* | (2011.01) | |
| *G06K 9/00* | (2006.01) | |
| *G06Q 30/06* | (2012.01) | |
| *H04M 1/725* | (2006.01) | |
| *H04W 4/021* | (2018.01) | |
| *H04W 4/029* | (2018.01) | |

(52) U.S. Cl.
CPC ..... *G06Q 30/0601* (2013.01); *G06Q 30/0643* (2013.01); *G06T 19/006* (2013.01); *H04M 1/72522* (2013.01); *H04M 1/72572* (2013.01); *H04W 4/021* (2013.01); *H04W 4/029* (2018.02); *G06K 9/00671* (2013.01); *G06K 2209/27* (2013.01); *G06T 2200/24* (2013.01); *H04M 2250/52* (2013.01)

(58) Field of Classification Search
CPC ............ G06Q 30/0601; G06Q 30/0643; G06T 19/006; G06T 2200/24; G06K 2209/27; G06K 9/00671; G06K 9/0063; H04M 2250/52; H04M 1/72522; H04M 1/72572
See application file for complete search history.

(56) References Cited

U.S. PATENT DOCUMENTS

| | | | | |
|---|---|---|---|---|
| 2014/0040950 A1* | 2/2014 | Clemente | ........... | H04N 21/4524 725/37 |
| 2014/0162560 A1 | 6/2014 | Ye et al. | | |
| 2015/0094031 A1 | 4/2015 | Liu | | |
| 2015/0149454 A1* | 5/2015 | Hieronymus | ......... | G06F 16/583 707/728 |
| 2015/0205760 A1* | 7/2015 | Hershey | ................. | G06N 20/00 702/181 |
| 2015/0257126 A1* | 9/2015 | Herz | ..................... | H04W 4/029 455/414.1 |
| 2016/0306351 A1* | 10/2016 | Fisher | ..................... | H04W 4/70 |
| 2016/0374047 A1* | 12/2016 | Reis | ................... | H04B 7/18517 |
| 2018/0024250 A1* | 1/2018 | Nishi | ..................... | G01S 19/23 342/357.62 |

OTHER PUBLICATIONS

Excerpt from "DishPointer + Android = satellite dish allignment" youtube video. Retrieved from <https://www.youtube.com/watch?v=IRLpKZMCRHo> on Nov. 8, 2018.Originally published Jan. 20, 2011.*

"Satellite AR". Retrieved from <https://web.archive.org/web/20140125095157/http://spacedata.agi.com/MobileApps/about.htm>. Originally captured Jan. 2014. Printed Nov. 8, 2018.*

"The AGI Source Book for Geographic Information Systems 1996", Published by Association for Geographic Information, 1995, 3 pages.

"Buying Optical Satellite Imagery? The Top 10 Things to Consider", Hubing, http://web.archive.org/web/2012111092555/http://www.landinfo.com/buying-optical-satellite-imagery.html, Nov. 2012, 2 pages.

"SatCam", Mooney, http://cimss.ssec.wisc.edu/education/cla/SatCamAugsut2012 Mooney.pdf, Aug. 2012, 19 pages.

"Press Release: Orbit Logic is Going Mobile: The Sibyl App: Task an Imaging Satellite from a handheld device.", http://www.orbitloqic.com/news/pr1011 Sibyl PR.php, Oct. 2011, 1 page.

Sybil Datasheet, http://www.orbitlogic.com/products/Sibyl%20Datasheet%202012.pdf, 2012, 2 pages.

* cited by examiner

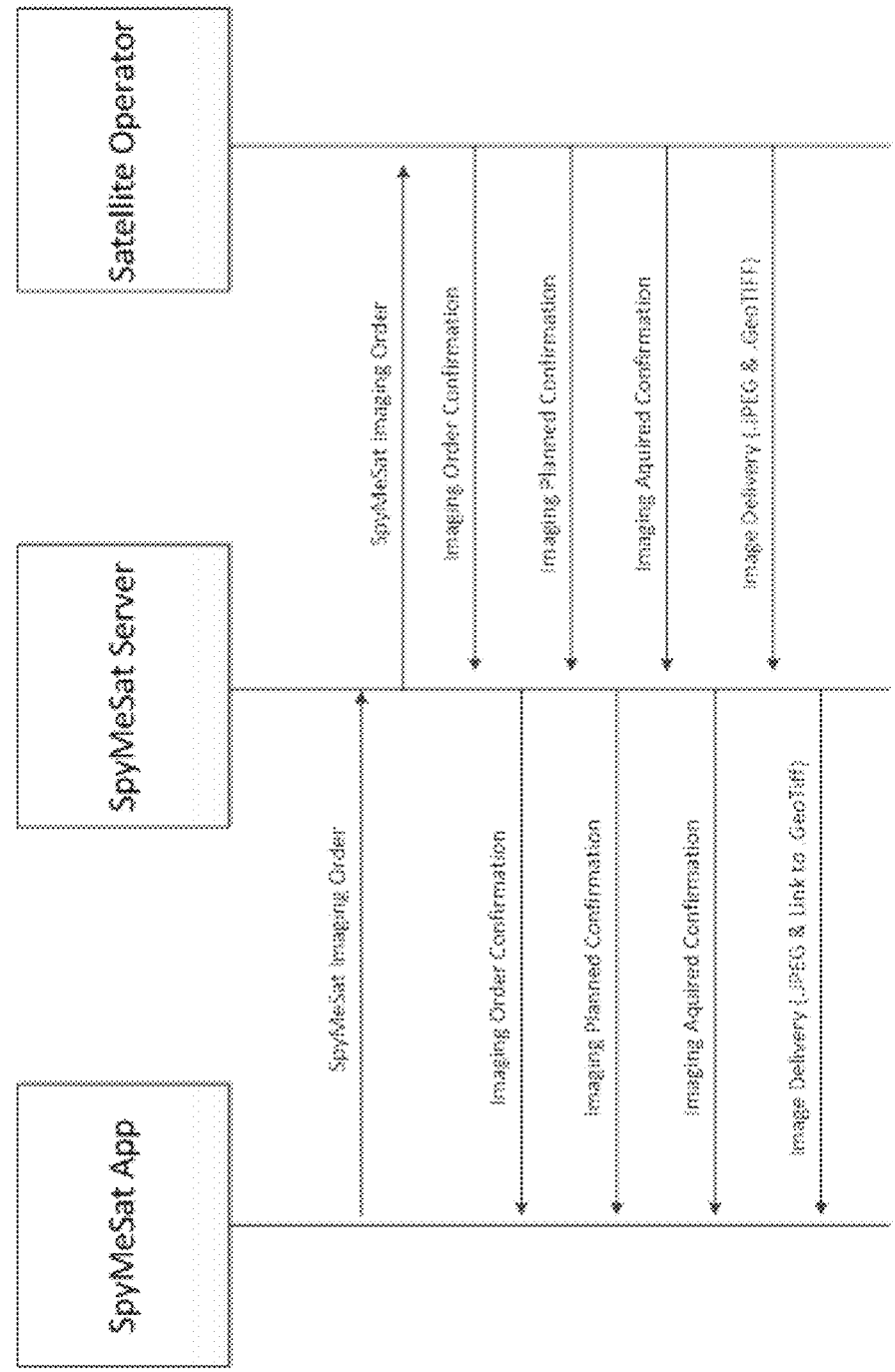

METHOD FOR PROVIDING IMAGING SATELLITE INFORMATION ON A MOBILE DEVICE

CROSS-REFERENCE TO RELATED APPLICATION

This application is a continuation-in-part of U.S. patent application Ser. No. 15/130,310, filed on Apr. 15, 2016, which is a continuation of U.S. patent application Ser. No. 14/630,807, filed on Feb. 25, 2015, which in turn claims the benefit of U.S. Provisional Application No. 61/947,941, filed on Mar. 4, 2014.

FIELD OF THE INVENTION

The present invention relates to providing imaging satellite information on a mobile device and, in particular, to augmenting a real-world image with imaging satellite information, to providing push notifications to mobile devices when new satellite imagery has been captured of user-relevant locations, and/or to providing advance user notifications when satellite imaging events will occur at a user-relevant location.

BACKGROUND

Applications and processes currently exist for users to determine when satellites may be flying overhead, the general location of satellites in orbit, and even to inform users when satellites flying overhead may be viewable from the ground.

However, there is currently no known approach for notifying users as to when a given satellite will be able to see them. In addition, unlike existing applications used for satellite imaging feasibility and planning by satellite operators, there is no known approach for providing real-time notifications and alerts to the user, or to provide other advanced imaging satellite information on a mobile device. It would be particularly advantageous to have such information since it would provide situational awareness to the user, as well as provide an opportunity to identify in real-time opportunities to obtain satellite imagery of certain locations, whether by purchase or otherwise.

BRIEF SUMMARY OF THE INVENTION

Disclosed and claimed herein is a method and electronic mobile device to display imaging satellite information on a mobile device using a mobile application configured to access satellite imagery. In one embodiment, the method includes determining a viewing direction and angle of a camera of the mobile device based on data received from one or more sensors of the mobile device, determining a location of the mobile device, and determining orbit information for one or more satellites in a vicinity of the location of the mobile device. Thereafter, the method includes computing satellite tracks for each of the one or more satellites determined to be in the vicinity of the location of the mobile device, where the satellite tracks are computed based on the location of the mobile device, the viewing direction and angle of the camera of the mobile device, and the orbit information corresponding to each of the respective one or more satellites. Finally, the method includes displaying, on a screen of the mobile device, a graphical representation of the satellite tracks computed for the one or more satellites as an overlay over a real world image being captured in real time by the camera of the mobile device.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 5 illustrates a flow diagram of one embodiment of a process by which a mobile device user may request that a satellite capture imagery of a specific location;

DETAILED DESCRIPTION OF EXEMPLARY EMBODIMENTS

Overview of the Disclosure

Figure 1:
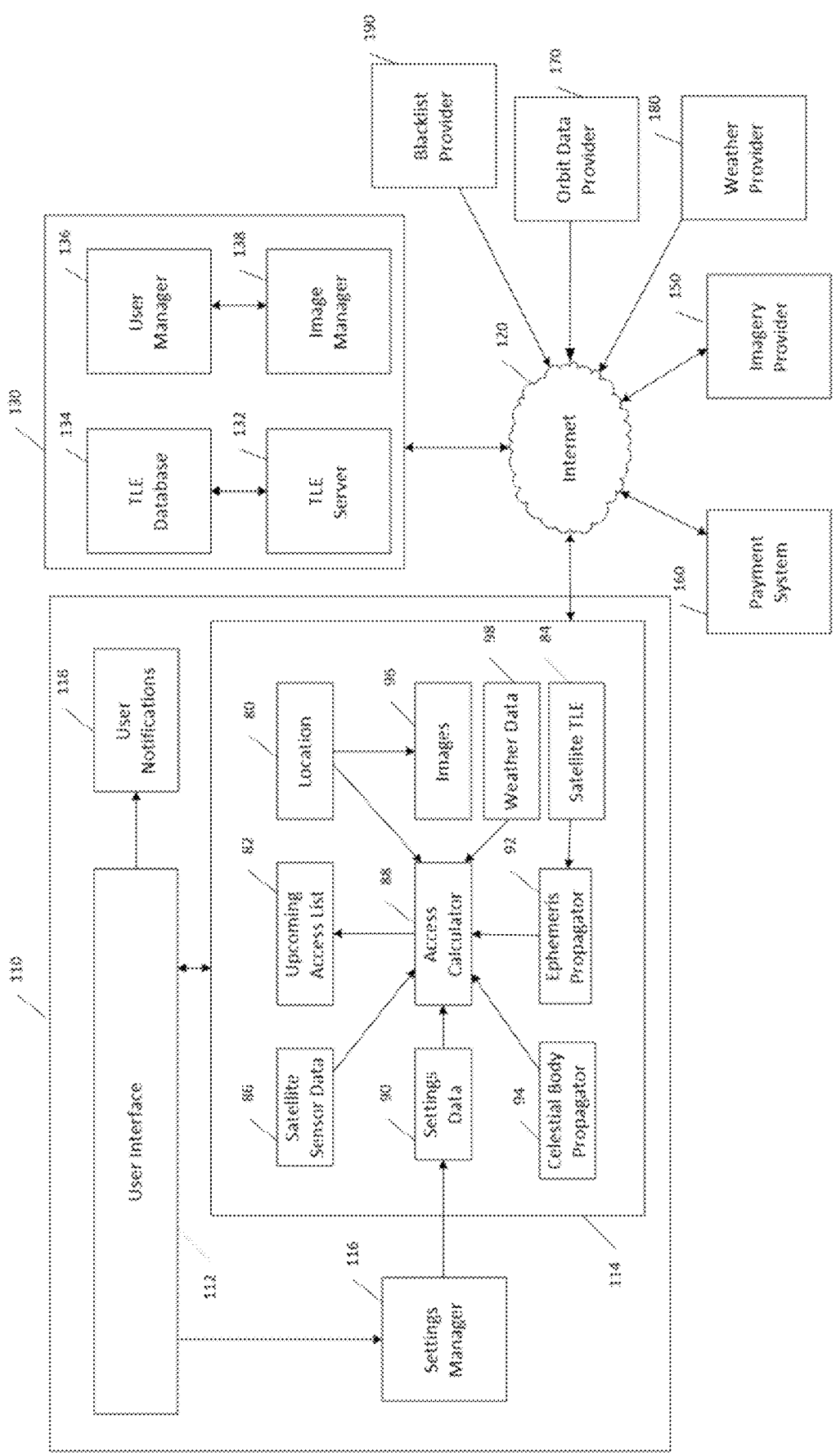
FIG. 1 is a simplified diagram of a system configured to implement one or more aspects of the invention.

The following disclosure relates to a process, which can be carried out on a mobile device such as a smartphone or tablet, in which real-time notifications may be provided to a user whenever imaging satellites are positioned in the vicinity of the user (i.e., overhead of the user's location), such that the imaging satellite is in a position to capture imagery of the user's location or a user-specified location.

Another aspect of the invention is to provide the user access, via the mobile device, to preview and/or purchase available satellite imagery.

In certain embodiments, the user may also be provided with the opportunity to issue, via the mobile device, a satellite tasking request such that a satellite will be tasked to capture imagery of a specific location.

Another aspect of the invention is to display an augmented reality image on the mobile device in which an actual, real world image is overlaid with graphical representations of one or more imaging satellites and/or their respective orbit tracks. Such tracks may be further annotated, for example, with information regarding satellite-specific information, such as, for example, time and satellite positioning information.

Still another aspect of the invention is to provide push notifications to the mobile device when new satellite imagery has been captured of one or more locations determined to be relevant to a user, e.g., locations previous identified by the user as being of interest, the user's current location, locations for which the user has previously purchased images, etc.

Yet another aspect of the invention is to provide an advance user notification as to when a satellite imaging event will occur at either the user's current location or at a location previously identified by the user.

It should be appreciated that all references herein to a "mobile device" encompass mobile devices, such as smartphones and tablets, operating individually, as well as mobile devices operating in communication with one or more secondary electronic devices, such as so-called smartwatches and smartglasses.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, A, B or C means any of the following: A; B; C; A and B; A and C; B and C; A, B and C. An exception to this definition will occur only when a combination of elements, functions, steps or acts are in some way inherently mutually exclusive. Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable storage medium, which may include any medium that can store information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Exemplary Embodiments of the Invention

As noted above, the present disclosure is directed to a process, which can specifically be carried out by an application program executing on a mobile device (also referred to herein as a "mobile app"), to provide users with real-time notifications (e.g., vibrations, sound alerts, and/or visual on-screen alerts) when imaging satellites are overhead and in a position to take a picture of the user's location.

In certain embodiments, the process carried out by the mobile app may compute and display, on the user's mobile device, satellite imaging opportunities while specifically taking into account one or more of lighting conditions, satellite orbit information, satellite sensor data, atmospheric conditions and other factors.

Referring now to FIG. 1, depicted is one embodiment of a system 100 configured to carry out one or more aspects of the invention. In particular, the system of FIG. 1 comprises a client-side user device 110, such as a smartphone or tablet, which is in wireless communication via an Internet connection 120 with a support server 130.

System 100 may optionally include at least one imagery provider 150 and/or at least one payment system 160. The imagery provider(s) 150 may include commercial satellite operators and other providers of satellite imagery, and may also include operators who can be tasked to collect new images. The payment system 160 may be configured to process image purchase payments and may include entities such as credit card companies or intermediaries, as well as online purchase mechanisms. System 100 may also include one or more weather data providers 180 from which weather data may be accessed by a user device 110 over via the Internet 120. Finally, system 100 may include a blacklist provider 190 from which may provide government restriction information, as described in more detail below.

The user device 110 further includes, in part, user interface 112, user notifications 118 and settings manager 116. It should of course be appreciated that the user device 110 may preferably be configured with additional, conventional hardware components, including for example, one or more microprocessors, volatile and non-volatile memory, and at least one of a cellular and a data network interface. The user device 110 preferably also includes a mobile operating system, as is generally known in the art.

With respect to the user interface 112, this component may control the display of data to the user via a mobile device screen. Such data may be displayed as graphics, such as maps or 3D globes, text data, and/or audio data for the visually impaired. Such data may similarly be displayed on a secondary electronic device (e.g., smartwatch or smartglasses) that is in communication with the user device 110 (e.g., via a Bluetooth™ connection). Moreover, the user interface 112 may be configured to enable users to view and change user-controlled process settings, such as the desired resolution threshold, etc.

The settings manager component 116 may include software that can influence and even override user process settings, particularly for notifications. The user notification component 118 may comprise a process component that notifies the user of process events, for example, of the impending start of a satellite imaging opportunity, as further described below. The settings manager component 116 works with the mobile device capabilities for visual, audio, and vibration alerts as configured in the process and device settings.

The user device 110 of FIG. 1 further comprises a mobile application and related data 114 ("mobile app 114") which is configured to implement one or more aspects of the invention. It should be appreciated that the mobile app 114 may comprise processor-executable instructions implemented in software (e.g., Objective C, Java, etc.) executing on the user device 110, along with certain associated data.

The mobile app 114 comprises an access calculator 88, which may be configured as a software-based engine that receives and operates on certain data to provide certain outputs. In particular, access calculator 88 may be configured to calculate windows (start and stop times) for imaging opportunities based on satellite state information, such as orbit ephemeris (position and time data for the satellite), target position, camera capabilities and resolution settings, target lighting conditions in conjunction with camera imaging mode capabilities, weather and other factors.

In this case, access calculator 88 is shown as receiving 'area of interest' information 80, which may specify the location/ground target for imaging opportunity computations in latitude and longitude (or similar) coordinates, as well as settings data 90, which comprises configurable parameter values, some of which may be selected by the user, that affect process computations.

Access calculator 88 also receives satellite sensor data 86, which includes information about the sensor (such as detector pitch and focal length) which may be used to compute imaging opportunities at various levels of resolution based on known information such as satellite position and point-of-interest location.

The mobile app 114 further includes an ephemeris propagator component 92, which is configured to generate a satellite ephemeris (which is a prediction of position over time) for each satellite based on a starting state (generally in the form of a Two-Line-Element (TLE)) and a propagation algorithm such as SGP4. The mobile app 114 also uses a celestial body propagator component 94 to predict the position of the Sun relative to the Earth, and predict the rotation of the Earth, and other relevant celestial object predictions. Images 96 may comprise a set of satellite images stored locally on the device by the mobile app 114, and can include both low resolution thumbnail and browse/preview images, as well as high resolution satellite images that have been purchased and downloaded to the device. Finally, the mobile app 114 may comprise a weather data component 98 configured to receive weather data from a weather data provider 180. Such weather data may be used by the access calculator 88 in connection with calculating windows (start and stop times) for imaging opportunities, as described above.

Continuing to refer to FIG. 1, the mobile app 114 is configured to connect to the support server 130 via an Internet connection 120, as noted above. In addition, the mobile app 114 may connect to other sources of data and/or satellite imagery or video (e.g., at least one imagery provider 150) either directly via the Internet connection 120 or indirectly via the support server 130.

It should further be appreciated that the mobile app 114 and/or support server 130 may be set up with any desired group of imaging satellites. For example, a public version of the mobile app 114 may include all commercial and unclassified imaging satellites (optical and radar) that have a certain resolution capability, e.g., 5 meters or better. Custom deployments can be used to provide private versions of the app for any imaging satellite constellation to a restricted set of users.

In certain embodiments, the support server 130 may provide updated satellite orbit data at process startup to support imaging opportunity computations. Satellite orbit data may be provided to the mobile app 114 using, for example, a JSON (JavaScript Object Notation) restful interface in TLE format in order to keep the data bandwidth requirements low. It should, however, be appreciated that the data may be provided in other formats. In certain embodiments, it is preferable that the mobile app 114 does not require a persistent connection to the support server 130 to function. In this fashion, if the mobile app 114 is unable to connect to the server at startup, the mobile app 114 process may use the last orbit data available to compute upcoming imaging opportunities, thereby providing normal functionality from the user's perspective, even though an active network connection may be unavailable.

The Satellite TLE component 84 handles satellite Two-Line-Element orbit data, which specifies the current/latest known orbit state of each satellite. This component preferably receives updated orbit data from support server 130 (obtained from at least one orbit data provider 170), which in turn provides the updated information to the ephemeris propagator component 92, described above.

As shown in FIG. 1, the support server includes a TLE server component 132, which provides updated satellite TLE orbit data to processes running on mobile devices when they have internet connectivity, for example. In addition, this component is preferably configured to retrieve or receive the latest satellite orbit data from one or more orbit data providers 170 (such as NORAD or an intermediary provider) automatically on a recurring basis. The TLE server component 132 is in communication with a TLE database 134, which stores the latest satellite orbit data, generally in the form of TLEs.

Support server 130 further includes a user manager component 136 which is configured to support optional user registration and store relevant user information, such as names, postal addresses, nationality, email addresses, passwords, purchase history, device type and other relevant information. The user manager component 136 may use such information, at least in part, to adhere to U.S. laws, including embargo and denied party restrictions.

Support server 130 is further depicted in FIG. 1 as including an image manager component 138 which may be configured to store registered users' purchased images using, for example, cloud storage methods, while associating each purchased image with a registered user account, when appropriate. This component may also support the re-downloading of images to a registered user's device upon request.

Based on the various processes and data described above, the access calculator 88 of the mobile app 114 generates an upcoming access list 82, which identifies future imaging opportunities, and provides the list 82 to the user interface 112 for presentation to the user, via either a display screen or audio output of the user device 110. In certain embodiments, when generating the upcoming access list 82, the mobile app 114 may further be configured to account for cloud forecast and/or current cloud cover and/or atmospheric conditions that affect certain types of satellite imaging, such as by using the aforementioned weather data component 98 to access weather data from an online source (e.g., weather data provider 180).

Figure 2C:
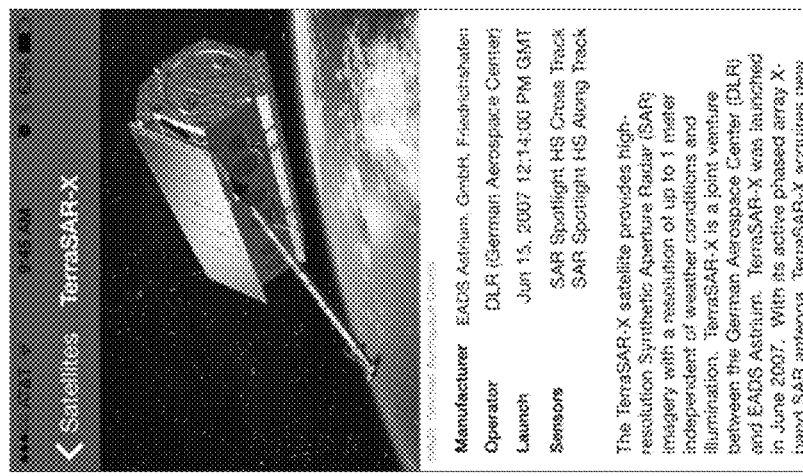
FIGS. 2A-2C depict various screenshots of a mobile device display screen depicting certain features of one or more embodiments of the invention.
Figure 2B:
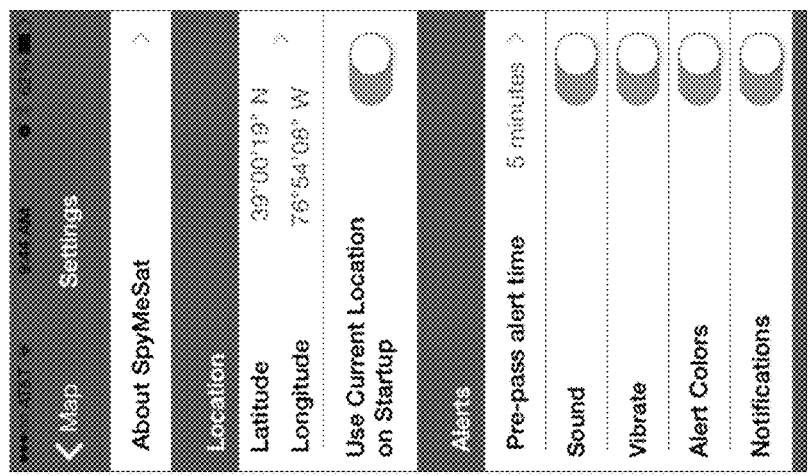
Figure 2A:
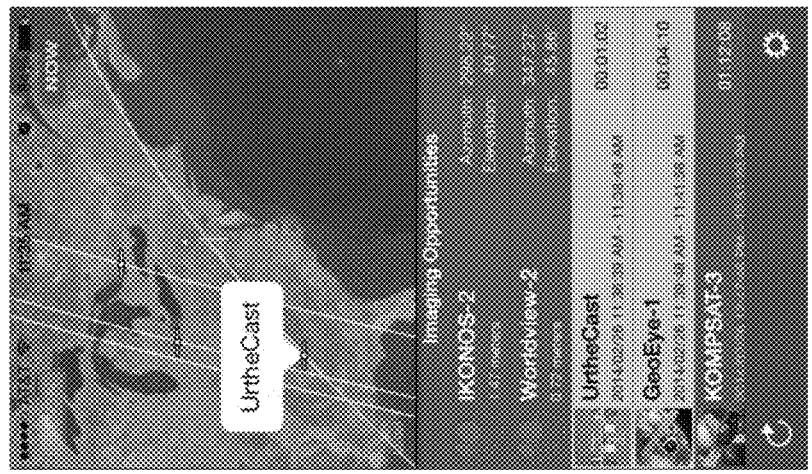

Referring now to FIG. 2A, depicted is one embodiment of a display screen on a user device (e.g., user device 110). In this embodiment, the display screen contains the upcoming access list 82 described above. A countdown may be provided for each computed future imaging opportunity. During the user notification period, the satellite ground track may be displayed on a map or 3D globe view. The satellite position may be displayed dynamically on the map or globe as it moves along its orbit in real-time, as shown in FIG. 2A. Moreover, imaging opportunity start and stop times may be displayed, and during the imaging opportunity, the position of the satellite and the instantaneous potential resolution of any images may be dynamically displayed.

The mobile app 114 may also provide, via a display screen of the user device, various configuration controls to the user, as shown in FIG. 2B. Such controls would allow the user to enable or disable the various notification alerts and map/globe color displays, set the notification timeframe, select or deselect specific satellites, select the resolution cutoff for alerts, select the type of sensors of interest (Radar and/or Optical), and set the location of interest. The default location of interest may be the user's current location, for example.

Referring now to FIG. 2C, the mobile app 114 may also be configured to display, on a display screen of the user device, descriptions of each satellite, including, by way of example, a rendering of the satellite, manufacturer, operator, and other interesting details about the satellite.

Figure 3B:
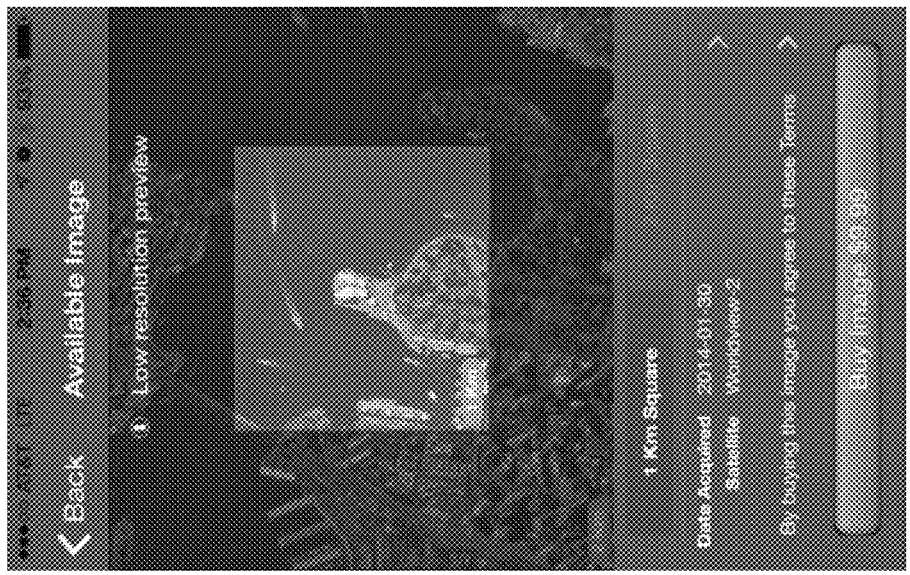
FIGS. 3A-3B depict various additional screenshots of a mobile device display screen depicting certain features of one or more embodiments of the invention.
Figure 3A:
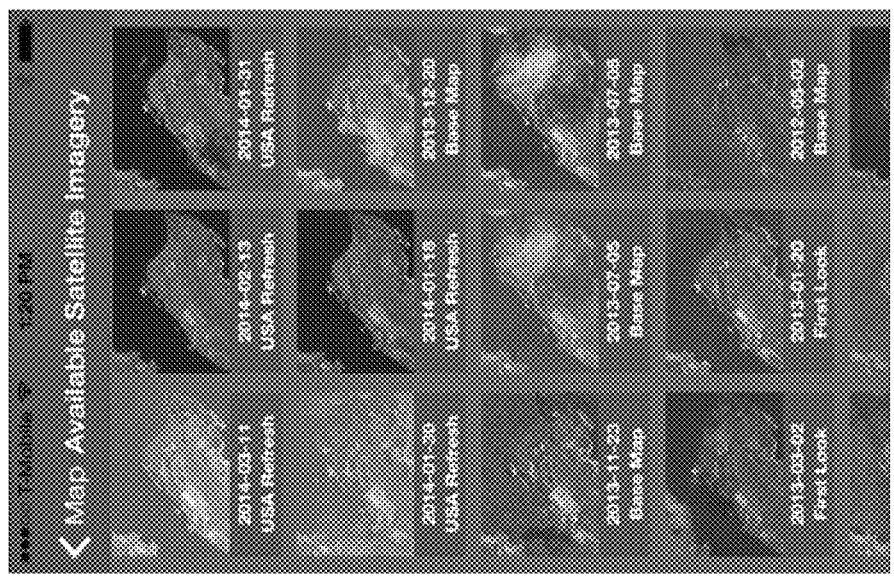

Additionally, the invention may also be configured to provide, by way of a user device display screen, access to preview and purchase archive satellite imagery of the user-specified location, providing iconified versions of all available images with certain high-level information of interest (such as the date the image was taken), an example of which is shown in FIG. 3A. The invention may also provide a user with the ability to select an image of interest, via the user device, to bring up a larger low-resolution preview image, and then to select from various purchase options (such as image size and format), an example of which is shown in FIG. 3B. The user may then proceed to purchase the image (e.g., in high resolution form) using an existing process account or anonymously via in-app purchase or other payment mechanism (e.g., payment system 160). The entire process can be completed in seconds, delivering satellite imagery for any location on demand.

In certain embodiments, users may be able to optionally register for an account with the support server (e.g., server 130). By registering for an account, the user can store images in an online storage (server or private or government clouds), and re-download previously purchased images.

In accordance with the above teachings, the current disclosure differs from known applications and processes in that the principles of the invention, as carried out on a mobile device, enables users to know when satellites can see THEM by applying computations for not only line-of-site visibility, but also based on the basic properties of the satellite imaging systems and the user location conditions, such as lighting. In addition, unlike existing applications used for satellite imaging feasibility and planning by satellite operators, the proposed process provides real-time notifications and alerts to the user to provide situational awareness.

As mentioned above, a connected support server (e.g., server 130) may be configured to provide users with access to relevant satellite imagery for preview and even purchase. The support server may be configured to connect to various commercial (and non-commercial) imagery databases through a variety of protocols (such as WFS and WMS) to discover and retrieve available and appropriately relevant satellite images, and then in turn to provide them to users' mobile devices for display. In certain embodiments, the support server may also act as the purchasing process layer for users wishing to purchase available image(s) by connecting to a payment processor or credit card verification entities (e.g., payment system 160), as appropriate based on the purchase option. The support server may manage user requests for image purchase, list user images, retrieve individual images, and manage user account details. As noted above, such communications are preferably performed using lightweight protocols, such as JSON.

In order to comply with export/trade restrictions or other desired location-based controls, certain process features, such as imagery purchase and/or new tasking purchase features, may be further controlled by the mobile app (enabled/disabled/reduced/enhanced) based on user location or the availability (or lack thereof) of device-based Location Services, or even on the status of user process account registration details in combination with the automated comparison against one or more blacklists, i.e., selected denied parties databases and/or government lists or databases of embargoed countries. Such blacklist information may be accessed from a government restriction data provider (e.g., blacklist provider 190), and may include information about countries subject to one or more restrictions, blacklists and/or embargos, as well as information about individuals or organizations that have been identified as being subject to one or more government restrictions and/or blacklists.

Figure 4A:
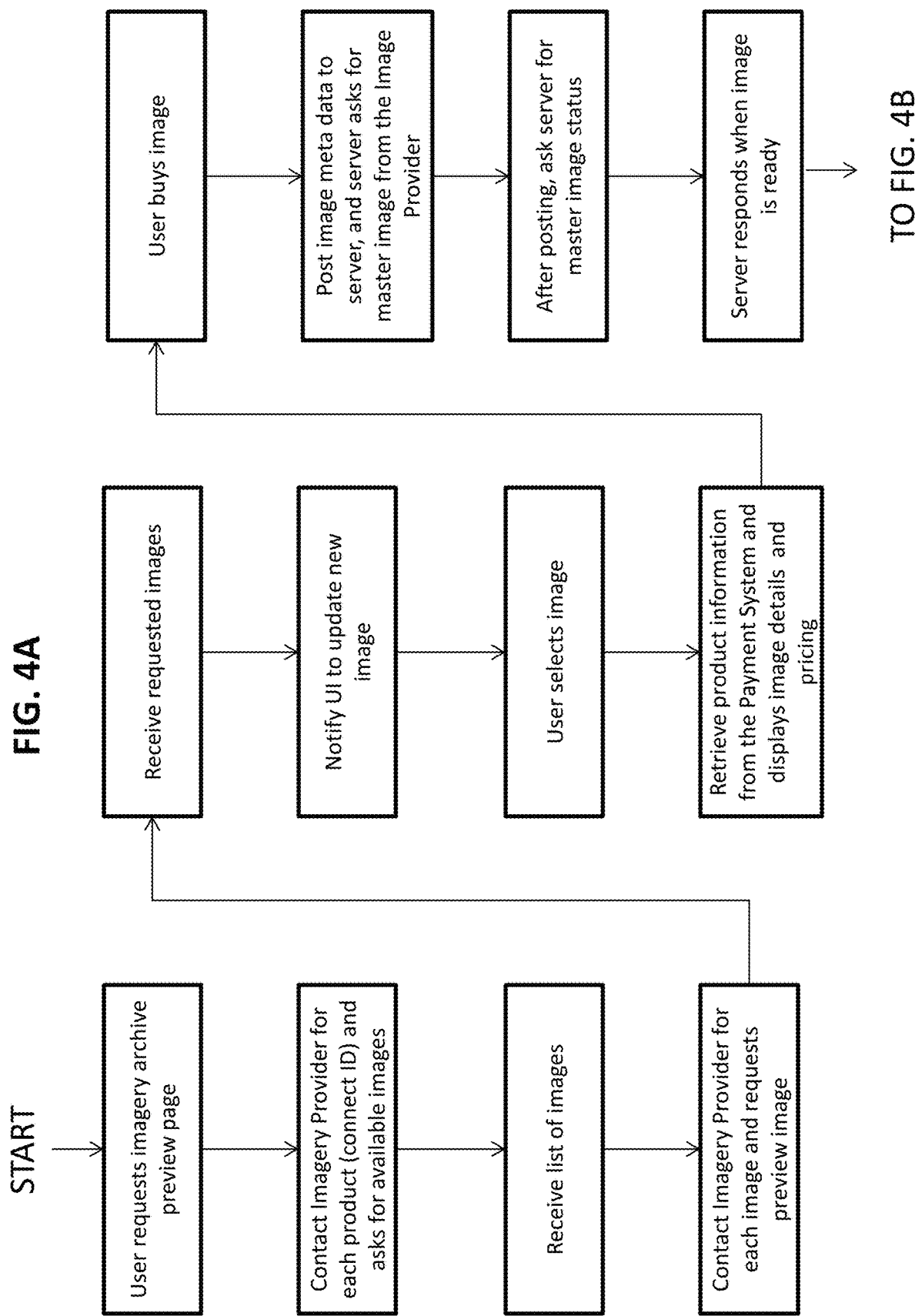
FIGS. 4A-4B illustrates a flow diagram of one embodiment of a process by which a user can purchase specific satellite imagery using a mobile device application.
Figure 4B:
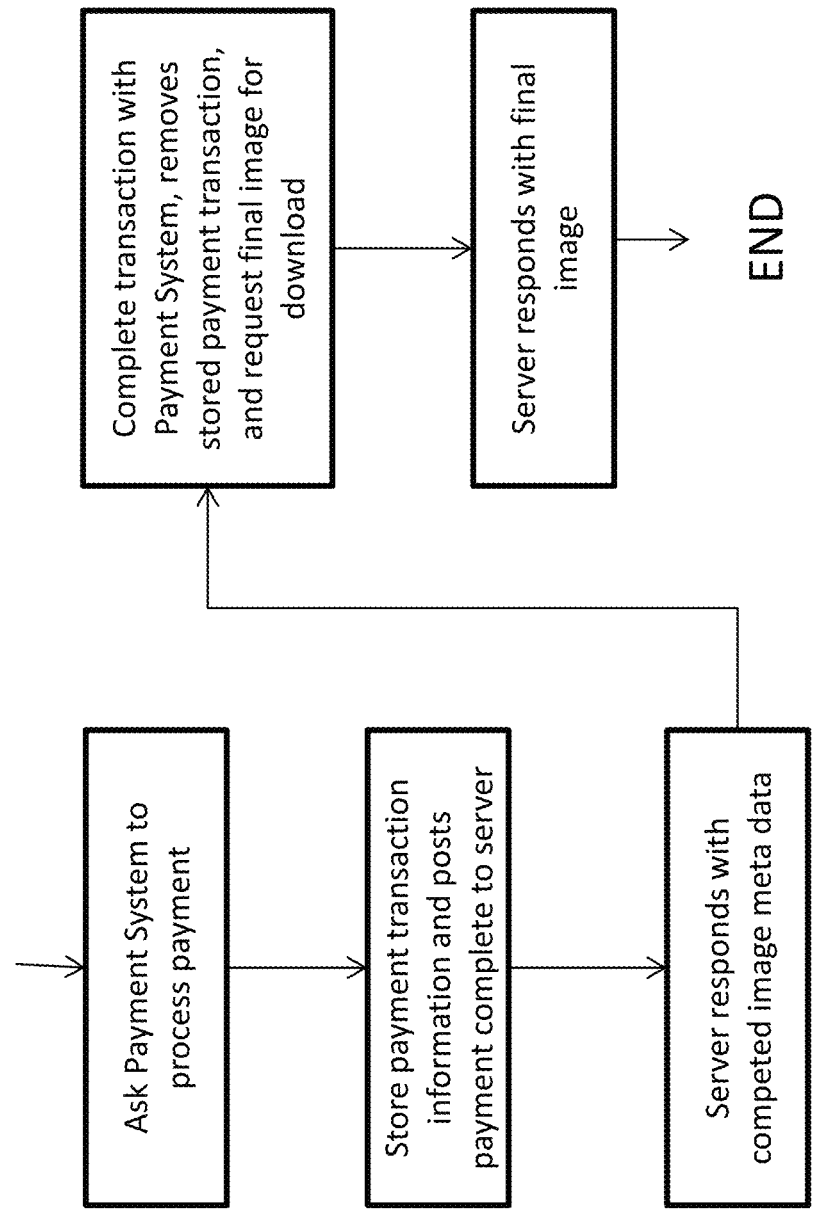

Referring now to FIGS. 4A-4B, depicted is a process for accessing and purchasing location-specific satellite images by a user of the aforementioned mobile application.

An example of how a user may interact with a mobile application configured in accordance with the principles of the invention will now be provided. Specifically, after having downloaded and installed the mobile application (e.g., mobile app 114) on a user device (e.g., user device 110), upon launching the mobile app, imaging satellite passes for the user-specified location or the user's current location (based on the smartphone's location services) may be automatically computed. These passes represent future imaging opportunities, which may be displayed on a display screen of the mobile device (e.g., FIG. 2A), where each imaging opportunity represents a time period during which one or more satellites will be capable of capturing satellite imagery of the user-defined location. The user may then close the app, make phone calls, etc.

Some predetermined amount of time later (e.g., five minutes) before each satellite imaging opportunity, the mobile app may be configured to notify the user of the impending satellite imaging opportunity, such as by vibration, sound alert, on-screen alert, etc. The user may then open the mobile app to see the satellite ground track and satellite position during and/or just before the imaging opportunity, and well as optionally having information on the resolution capability of the satellite's imaging sensor and other satellite description information (e.g., FIG. 2C).

Thereafter, the user may then browse through available satellite imagery of their location (e.g., FIG. 3A) and may decide to purchase a recent satellite image of their neighborhood, adding it to their previously-purchased satellite imagery collection within the mobile app. Later, the app may notify the user that a new image of a previously purchased location is available, and the user may then purchase the new image to add to their collection (e.g., using the process of FIGS. 4A-4B). The user, perhaps wanting to get a recent satellite image of another location (his vacation house), may find through the mobile app that no good recent satellite images are available of that location and, as a result, may decide to order new tasking of a satellite, or the mobile app may be configured to automatically provide an advance notification as to when the next satellite imaging event will occur at the user's current location or at a location previous identified by the user. In either case, the mobile app may notify the user of the exact moment that the image will be taken (e.g., a few minutes, hours or days before the event) so that the user can plan accordingly. The user may gather his family outside their vacation house at the moment the image is to be taken, having everyone smile and wave at the location of the satellite based on the mobile app real-time flyover information. Later, the user will be notified that the image is ready and may be provided a link to download the image from the app server online. The user may then download and disseminate the image, such as by posting it on social media, showing a satellite view of the user's family waving in front of their vacation home.

It should be appreciated that the above timing notifications may be carried out by the tasking process and interface between the user's mobile app, mobile app server, and the satellite operator. Specifically, message exchanges may be used between the mobile app server and satellite operator for tasking requests and scheduled imaging events. Tasking request users receive messages from the server which drive notifications and updates to tasking status within the mobile app.

Messaging between the mobile app server and satellite operator may take various forms, including email and web messaging. In one embodiment, the message exchange order may proceed as follows:
1. Tasking Request Message (sent from mobile app server to satellite operator)—may contain all pertinent information about the imaging order including imaging location, satellite, priority, and constraints,
2. Order Confirmation Message (sent from satellite operator to mobile app server)—indicates acceptance or rejection of the order by the satellite operator,
3. Image Planned Message (sent from satellite operator to mobile app server)—specifies the time that the image will be attempted by the satellite. The specific message is critical for the "space selfie" concept, and unique in the industry.
4. Image Acquired Message (sent from satellite operator to mobile app server) indicates the status of the attempted image (success or failure)
5. Image Delivery Message (sent from satellite operator to mobile app server) provides a link for the mobile app server to connect to in order to download the image data.

For all of the messages listed above, the mobile app server may function as the intermediary between the mobile app and the satellite operator. Information received from the app is forwarded to the satellite operator via the mobile app server (orders) and information from the satellite operator is converted into the proper format and sent to the mobile app user via the mobile app server.

Figure 6:
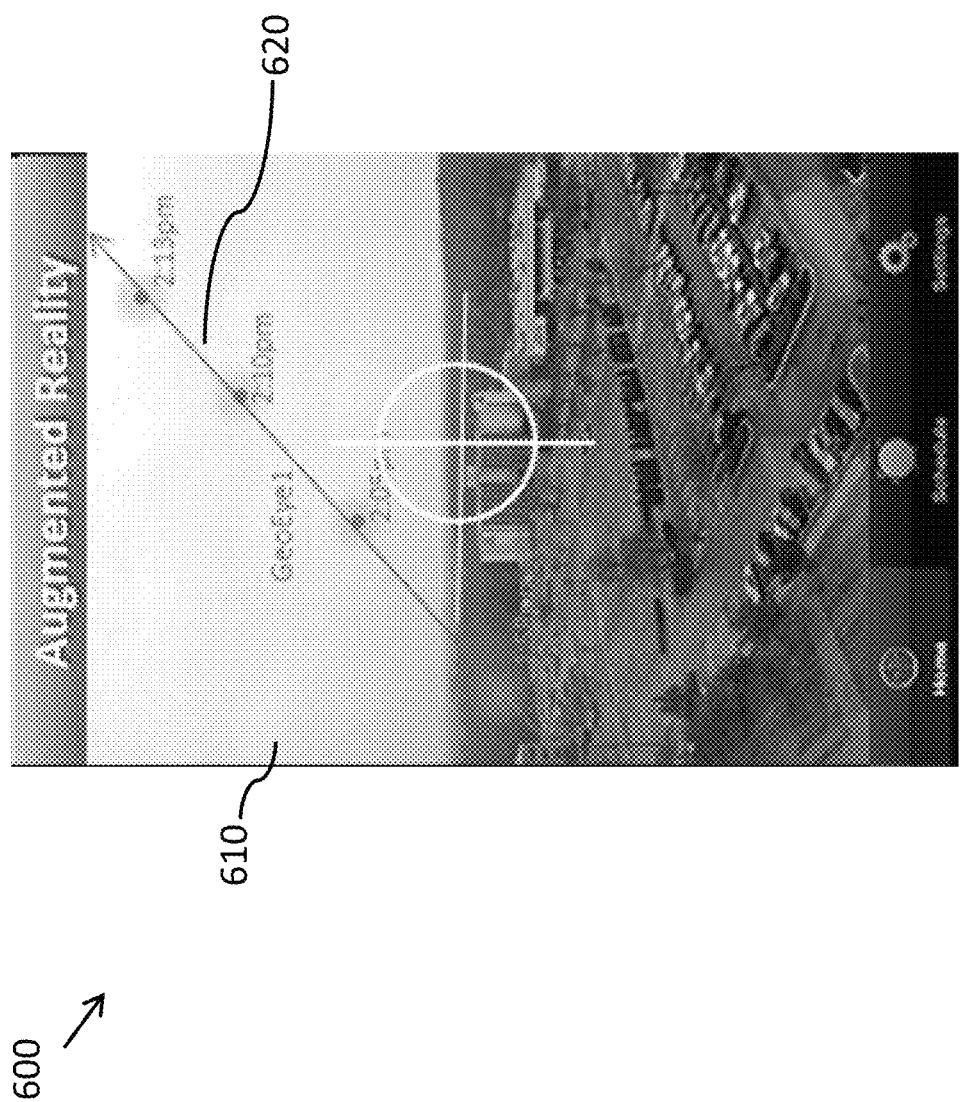
FIG. 6 depict a screenshot of a mobile device display screen depicting one embodiment of the augmented reality feature in accordance with the principles of the invention.

In one or more additional embodiments, a mobile app configured in accordance with the principles of the invention may further (i) provide user notifications when a new satellite image is available for a previously purchased location or any user-specified favorite location or special events of general public interest, (ii) provide a mechanism for the mobile device user to order new tasking (e.g. request that a satellite take a new picture of the user location or user-specified location) (e.g., using the process of FIG. 5), and/or (iii) as described in more detail below with reference to FIG. 6, provide an Augmented Reality feature to allow the user to see the real-time satellite positions and other relevant data as an overlay on the mobile device camera view of the real world.

As mentioned above in (i), one aspect of the invention is to provide user notifications when new, relevant satellite imagery is available to the user. Specifically, push notifications may be provided to the mobile device when new satellite imagery has been captured of one or more locations that are determined to be relevant to a particular user. Specifically, push notifications can be provided by the mobile app for user-relevant imagery based on one or more of user-specified locations, locations corresponding to the user's prior image purchases, the mobile device's current location, locations of newsworthy events (e.g., human interest, natural disasters, etc.), locations corresponding to addresses in the user's contacts list on the mobile device, etc. In certain embodiments, the mobile app may communicate user-relevant locations of interest to a backend server (e.g., support server 130), which may in turn maintain a database of user-relevant locations to scan. The backend server may then use these locations to perform periodic queries against a database of an imagery provider (e.g., imagery provider 150), or against multiple databases of imagery providers. A user notification indicating that new, relevant satellite imagery is available may be sent to the user via the mobile device when one of the queries returns a location match.

Locations of interest for each user may be defined by the user through a 'Favorite Locations' feature that allows the user to specify location(s) according to, for example, an address, latitude and longitudinal coordinates, point of interest, general map search, or map pin drop. The user may optionally opt-in to automatically adding purchased image locations to their 'Favorite Locations' list, and optionally opt-in to receive notification about new imagery related to major natural and human interest events, and for the user's current location (as determined by their device Location Services, for example). The mobile app server may retrieve the 'Favorite Locations' list for each registered mobile app user and create a general list of locations with user tags. The mobile app server may then query available satellite imagery archives on a regular (configurable) basis to search for images of each location with date tags more recent than the last time the associated user opened the mobile app and connected to the mobile app server. In certain embodiments, the list of available images for a specified location may be retrieved using the imagery archive's API (generally a WFS call). The returned list of images and associated metadata may then be processed by the server to identify the "new" images associated with each user's 'Favorite Locations.' The server may then generate corresponding push notifications for the user such that they are notified (via the mobile app on their mobile device) of the availability of new images for their 'Favorite Locations.' In this fashion, an improved user experience is achieved since notifications are focused on imagery determined to be relevant to the particular user.

In other embodiments, satellite passes may be highlighted (e.g., using graphical badges and/or different colors) in a particular section or page of the mobile app, or by way of a notification, to indicate that an imaging satellite is available to be tasked by the user to capture new imagery corresponding to a location of interest. In this fashion, users may be provided with an automated means by which to purchase archived satellite imagery of interest, as well as a way to request satellite imagery of interest knowing that the imagery will be available to the user.

As mentioned above in (iii), another aspect of the invention is to provide an augmented reality feature in which a user is able to see the real-time satellite positions and other relevant data as an overlay on the mobile device's camera view of the real world. Specifically, an augmented reality image may be displayed by the mobile app on the display of the mobile device in which an actual, real world image is overlaid with graphical representations of one or more imaging satellites and/or their respective orbit tracks. Such satellite tracks may be further annotated, for example, with information regarding satellite-specific information, such as, for example, time and satellite positioning information.

Referring now to FIG. 6, depicted is one embodiment of the augmented reality feature in accordance with the principles of the invention. In particular, FIG. 6 depicts one embodiment of a display screen 600 on a user device (e.g., user device 110). A shown, display screen 600 is comprised of a real world image 610 corresponding to the real-time mobile device's camera view of the real-world as the user is holding up and aiming the mobile device's camera in some direction and at some angle.

As shown in FIG. 6, the real world image 610 is then augmented or overlaid with a graphical representation showing time-position data for one or more imaging satellites as "satellite track data 620." Specifically, satellite track data 620 comprises the specific satellite positions, within the current real world view of the mobile device's camera, at specific points in time, including points in time in the future.

As such, the augmented reality feature of the present invention allows users to know when the imaging satellite may be behind a tree, building, cloud, or other obstruction as it flies overhead, potentially limiting its imaging ability. This will enable the user to have more complete situational awareness and to pick the best location and time at which to be in order to maximize (or minimize, if desired) the quality of the imaging opportunity.

Figure 7:
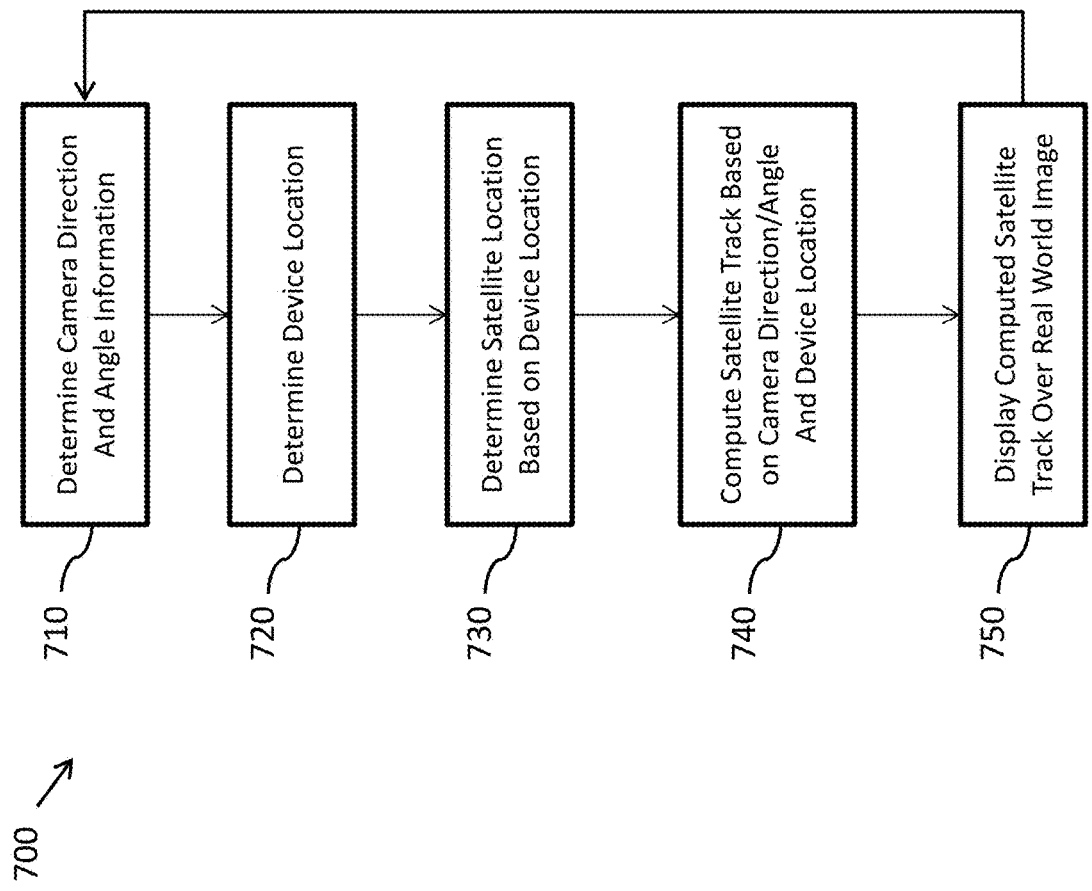
FIG. 7 depicts one embodiment of a process for implementing the augmented reality feature of the invention.

Referring now to FIG. 7, depicted is one embodiment of a process for implementing the augmented reality feature of the invention. Process 700 begins with block 710 where camera direction and angle information is received and/or derived by the mobile app from the mobile device's sensor data. At block 720, the current location of the mobile device is then determined by the mobile app, such as by accessing the mobile device's GPS data. It should be appreciated that the operations of blocks 710 and 720 may be performed in any order.

Process 700 may then continue to block 730 where satellite orbit information may be determined by the mobile app executing on the mobile device. In certain embodiments, this information may be determined by comparing the mobile device's current location (determined at block 720) to satellite orbit data that is accessed from an orbit data provider (e.g., orbit data provider 170) to determine which, if any, imaging satellites are (or will be) in the vicinity of the mobile device. In certain embodiments, the mobile app may perform a database query of a satellite orbit database of an orbit data provider, based on the location of the mobile device, to determine the satellite orbit information. It should appreciated that, in other embodiments, the operation of block 730 may be performed by a backend server (e.g., support server 130).

In certain embodiments, imaging satellites may be considered to be in the vicinity of the mobile device when the location, flight path and imaging capabilities of the imaging satellite indicate that the satellite is capable of capturing imaging data of the mobile device's location. A quality threshold may be used to filter out satellites that the mobile app will not consider. In certain embodiments, the quality threshold may be based based on image resolution (<5 m, <2.5 m, <1 m, etc. The mobile app may also apply lighting constraints (when applicable to the sensor in question) and may also apply weather condition thresholds (e.g. cloud cover limits) if applicable to the sensor. It should be noted that the resolution and other quality criteria may be dynamically computed by the app because the quality criteria (like resolution) may vary based on range and collection geometry as the satellite moves in orbit relative to the target location.

Thereafter, process 700 continues to block 740 where satellite tracks are computed for those satellites determined to be the vicinity, as a function of the satellite(s) overflight path(s), current satellite location(s), the mobile devices current location (from block 720) and the current camera direction and angle information (block 710). As shown in FIG. 6, such satellite tracks are preferably represented as satellite positions that vary as a function of time.

While the operations of blocks 730 and 740 are described above as being performed by the mobile app executing on the mobile device, it should be appreciated that all or some of the operations may instead be performed by a backend server with the resulting information and/or computations being sent by the backend server to the mobile device in order to reduce the processing overhead on the mobile device.

Continuing to refer to FIG. 7, once the satellite track data has been computed, a graphical representation of the computed satellite track data (e.g., satellite track data 620) may be displayed as an overlay over the real world image currently being captured by the mobile device's camera (e.g., real world image 610). One embodiment of the combined augmented reality display is shown in FIG. 6.

Moreover, since the accuracy of the displayed satellite track data is entirely dependent on the current camera direction and angle, as well as on the device's location, process 700 is preferably performed on an iterative basis, as shown in FIG. 7. For example, process 700 may be performed on an iterative basis while the mobile app remains open on the mobile device, or while the augmented reality feature of the mobile app is being accessed by the user.

In addition to displaying the above graphical representation of satellite track data on the display screen 600, in other embodiments graphically displayed directional guides (e.g., arrows, azimuth and elevation data, etc.) may be used to assist the user in finding imaging satellites in the sky (i.e., in a camera view of the sky), and may also be overlaid on the real world image 610 of display screen 600. Additionally, a targeting feature may be displayed to indicate when the user is pointing the device accurately at a satellite, for example, with the display also being augmented with popup information about that satellite (e.g., name, operator, launch date, imaging type, resolution, etc.).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for displaying imaging satellite information on a mobile device using a mobile application configured to access satellite imagery, the method comprising the steps of:
   determining a viewing direction and angle of a camera of the mobile device based on data received from one or more sensors of the mobile device;
   determining a location of the mobile device;
   determining orbit information for only those satellites capable of capturing satellite imagery of the location of the mobile device ("imaging satellites");
   dynamically computing a time-varying quality threshold based on range and collection geometry as the imaging satellites move in orbit relative to the mobile device location and at least one of an image resolution, a lighting constraint and a weather conditions;
   filtering out from further consideration one or more of said imaging satellites based on the dynamically-computed, time-varying quality threshold;
   computing satellite tracks for each of the remaining one or more imaging satellites based on the location of the mobile device, the viewing direction and angle of the camera of the mobile device, and the corresponding orbit information; and displaying, on a screen of the mobile device, a graphical representation of the satellite tracks as an overlay over a real world image captured in real time by the camera of the mobile device.

2. The method of claim 1, wherein determining orbit information for the imaging satellites comprises performing a database query of a satellite orbit database of an orbit data provider based on the location of the mobile device.

3. The method of claim 1, further comprising displaying, on the screen of the mobile device, graphical directional guides overlaid on the real world image, wherein the graphical directional guides are configured to assist a user of the mobile device in locating imaging satellites in a camera view of the mobile device.

4. The method of claim 1, further comprising providing, by the mobile application, a user notification of a time of an upcoming satellite imaging event in response to receiving an image planned message, wherein the upcoming satellite imaging event corresponds to a satellite imaging task that is scheduled to occur at said one of the location of the mobile device and the user-specified location.

5. The method of claim 1, further comprising determining if new, relevant satellite imagery becomes available, wherein relevant satellite imagery comprises satellite imagery that is determined to correspond to at least one of a user-specified location, a location corresponding to a user's prior image purchase, the mobile device's current location, a location of a newsworthy event, and a location corresponding to an address in a contact list stored on the mobile device.

6. The method of claim 5, further comprising providing, by the mobile device, a user notification when new, relevant satellite imagery is determined to be available.

7. The method of claim 5, wherein determining if new, relevant satellite imagery becomes available comprises:

transmitting, by the mobile device, user-relevant locations of interest to a backend server;

performing, by the backend server, a database query of an imagery provider database based on the user-relevant locations of interest, wherein the imagery provider database comprises a plurality of satellite images taken at different locations; and providing, by the mobile application, a user notification in response to the database query returning a match indicating that at least one of the plurality of satellite images corresponds to one of the user-relevant locations of interest.

8. An electronic mobile device comprising:

a memory containing processor-executable instructions, including a mobile application configured to access satellite imagery; and a processor electrically coupled to the memory, the processor configured to execute the mobile application to:

determine a viewing direction and angle of a camera of the mobile device based on data received from one or more sensors of the mobile device, determine a location of the mobile device, determine orbit information for only those satellites capable of capturing satellite imagery of the location of the mobile device ("imaging satellites"), dynamically compute a time-varying quality threshold based on range and collection geometry as the imaging satellites move in orbit relative to the mobile device location and at least one of an image resolution, a lighting constraint and a weather condition, filter out from further consideration one or more of said imaging satellites based on the dynamically-computed, time-varying quality threshold, compute satellite tracks for each of the remaining one or more imaging satellites based on the location of the mobile device, the viewing direction and angle of the camera of the mobile device, and the corresponding orbit information, and display, on a screen of the mobile device, a graphical representation of the satellite tracks computed for the one or more satellites as an overlay over a real world image being captured in real time by the camera of the mobile device.

9. The electronic mobile device of claim 8, wherein the processor is further configured to execute the mobile application to perform a database query of a satellite orbit database of an orbit data provider based on the location of the mobile device.

10. The electronic mobile device of claim 8, wherein the processor is further configured to execute the mobile application to display, on the screen of the mobile device, graphical directional guides overlaid on the real world image, wherein the graphical directional guides are configured to assist a user of the mobile device in locating imaging satellites in a camera view of the mobile device.

11. The electronic mobile device of claim 8, wherein the processor is further configured to execute the mobile application to provide a user notification of a time of an upcoming satellite imaging event based on at least one of the location of the mobile device and a user-specified location, wherein the upcoming satellite imaging event corresponds to a satellite imaging task that is scheduled to occur at said one of the location of the mobile device and the user-specified location.

12. The electronic mobile device of claim 8, wherein the processor is further configured to execute the mobile application to provide a user notification when new, relevant satellite imagery is determined to be available, wherein relevant satellite imagery comprises satellite imagery that is determined to correspond to at least one of a user-specified location, a location corresponding to a user's prior image purchase, the mobile device's current location, a location of a newsworthy event, and a location corresponding to an address in a contact list stored on the mobile device.

13. The electronic mobile device of claim 12, wherein the processor is further configured to execute the mobile application to transmit, to a backend server, user-relevant locations of interest, whereby the user-relevant locations of interest are usable by the backend server to perform a database query of an imagery provider database, wherein the imagery provider database comprises a plurality of satellite images taken at different locations.

14. The method according to claim 1, wherein the satellite track computing step is performed by the mobile application.

15. The method according to claim 1, wherein the satellite track computing step is performed by a server, and the resulting satellite tracks are sent to the mobile application for display.

16. The electronic mobile device according to claim 8, wherein the satellite tracks are instead computed on a server and sent to the electronic mobile device for display.

17. A method for displaying imaging satellite information on a mobile device using a mobile application configured to access satellite imagery, the method comprising the steps of:

determining a location of the mobile device;
determining orbit information for only those satellites capable of capturing satellite imagery of the location of the mobile device ("imaging satellites");
dynamically computing a time-varying quality threshold based on range and collection geometry as the imaging satellites move in orbit relative to the mobile device location and at least one of an image resolution, a lighting constraint and a weather conditions;
filtering out from further consideration one or more of said imaging satellites based on the dynamically-computed time-varying quality threshold; and
displaying, on a screen of the mobile device, a graphical representation of real-time imaging satellite positions as an overlay on the mobile device camera view of the real world.

18. An electronic mobile device comprising:
a memory containing processor-executable instructions, including a mobile application configured to access satellite imagery; and
a processor electrically coupled to the memory, the processor configured to execute the mobile application to:
determine a location of the mobile device,
determine orbit information for only those satellites capable of capturing satellite imagery of the location of the mobile device ("imaging satellites"),
dynamically compute a time-varying quality threshold based on range and collection geometry as the imaging satellites move in orbit relative to the mobile device location and at least one of an image resolution, a lighting constraint and a weather conditions,
filter out from further consideration one or more of said imaging satellites based on the dynamically-computed time-varying quality threshold, and
display, on a screen of the mobile device, a graphical representation of real-time imaging satellite positions as an overlay on the mobile device camera view of the real world.

* * * * *